United States Patent [19]

Hiasa et al.

[11] 3,929,600
[45] Dec. 30, 1975

[54] PROCESS OF REMOVING AMMONIACAL NITROGEN FROM WASTE WATER

[75] Inventors: Toshihisa Hiasa, Nishiariba; Hirohisa Ishimard, Arita, both of Japan

[73] Assignee: Iwao Engineering Co., Inc., Tokyo, Japan

[22] Filed: Apr. 3, 1975

[21] Appl. No.: 564,648

[30] Foreign Application Priority Data
Apr. 9, 1974 Japan................................. 49-40160
Feb. 20, 1975 Japan................................. 50-21362

[52] U.S. Cl. ................ 204/149; 204/102; 204/128; 204/130; 204/180 B
[51] Int. Cl.² .......................................... C02B 1/82
[58] Field of Search ............ 204/98, 102, 128, 149, 204/130, 180 B, 91

[56] References Cited
UNITED STATES PATENTS

| | | | |
|---|---|---|---|
| 1,118,993 | 12/1914 | Wood | 204/91 |
| 2,209,681 | 7/1940 | Kokatnur et al. | 204/128 X |
| 2,763,607 | 9/1956 | Staverman | 204/180 B |
| 3,428,535 | 2/1969 | Putnam | 204/149 |
| 3,582,485 | 6/1971 | Guter et al. | 204/149 |

*Primary Examiner*—John H. Mack
*Assistant Examiner*—A. C. Prescott

[57] ABSTRACT

The present invention relates to a process for removing ammonia nitrogen by recycling a treating liquid as a medium in a closed system including an ion-exchange process, an adsorption process, an elution process, an electrolysis process, an adjusting process and an cleansing process to prevent secondary pollution and improve removing ability.

10 Claims, 1 Drawing Figure

PROCESS OF REMOVING AMMONIACAL NITROGEN FROM WASTE WATER

BACKGROUND OF THE INVENTION

The ammonia nitrogen contained in drainage such as the effluent from the waste water treatment plant often causes the environmental pollution and, for example, eutrophy of lakes, marshes, rivers, bays less influenced by current, and inland sea. These phenomena bring about dullness of the coastal and culturing fishery and destruction of the ecological system in the inland area. Some processes have been proposed for removing the ammoniacal nitrogen in the drainage: 1) ammonia stripping, 2) break point chlorination and 3) ion-exchange method. In the ammonia stripping method, ammonia is less effectively removed because of a decrease of stripping ability when it is cold. Furthermore, some procedures are necessary to prevent the secondary pollution due to ammonia gas liberated from ammonium ion in the drainage. In the method of break point chlorination, adjustment of pH decreased by the direct addition of chlorine to the drainage and treatment of chloramines, formed as a byproduct, with active carbon and of remaining residual chlorine in the drainage are necessary. In addition, treating plant cannot help being complicated one because liquid chlorine is used in proportion to the concentration of the ammonia nitrogen in the drainage and some devices are needed for handling of liquid chlorine. Moreover, the inevitable diffect of the break point chlorination is to increase the chloride concentration of the effluent. In the ion-exchange method, the ammonium ion contained in drainage is adsorbed in an ion-exchange substance such as natural or synthetic zeolite. And then the ammonium ion is eluted in the alkali salt or alkali hydroxide solution from the ion-exchange substance, is discharged in the atmosphere by stripping method. Accordingly, in the ion-exchange method, some procedure are necessary to prevent the secondary pollution and the decrease of stripping ability when it is cold in common with the ammonia stripping method. In other ion-exchange method, the ammonium ion is directly decomposed by the oxidizing action of chlorine in the ion-exchange substance column, accordingly the ammonium ion eluting is obstructed by generating gas.

SUMMARY OF THE INVENTION

An object of this invention is to provide a novel method for removing the ammonia nitrogen by conversion of the said ammonia nitrogen to the inert nitrogen in a closed system, recycling the treating liquid, to prevent secondary pollution and by successive treatment, such as adsorption, elution electrolysis, adjustment of pH, and cleansing, of the drainage containing the ammonia nitrogen to improve removing ability. According to this invention, the ammonia nitrogen in the drainage is adsorbed in an ion-exchange substance such as zeolite, the ammonia nitrogen is eluted by treating the ion-exchange substance with a treating liquid containing mainly alkali metal chlorides to regenerate the said ion-exchange substance, the treating liquid containing the ammonia nitrogen is electrolyzed to produce active chlorine which decomposes oxidatively the ammonia nitrogen, the gas generated by the decomposition is brought into contact with an adjusting liquid, containing a hydroxide of the same alkali metal as that used in the said treating liquid, to be absorbed its acid gas containing mainly chlorine and nitrogen oxide, cleansed, then, by passing through active carbon and discharged, the adjusting liquid which has absorbed the acid gas is added to the electrolyzed treating liquid to adjust hydrogen ion concentration, to supplement the alkali metal ion and decompose the remained ammonia nitrogen by the recovered active chroline, and finally the treating liquid is recirculated, after cleansing by passing through active carbon to decompose residual chlorine to the initial ion-exchange process.

DETAILED DESCRIPTION OF THE INVENTION

Figure 1:
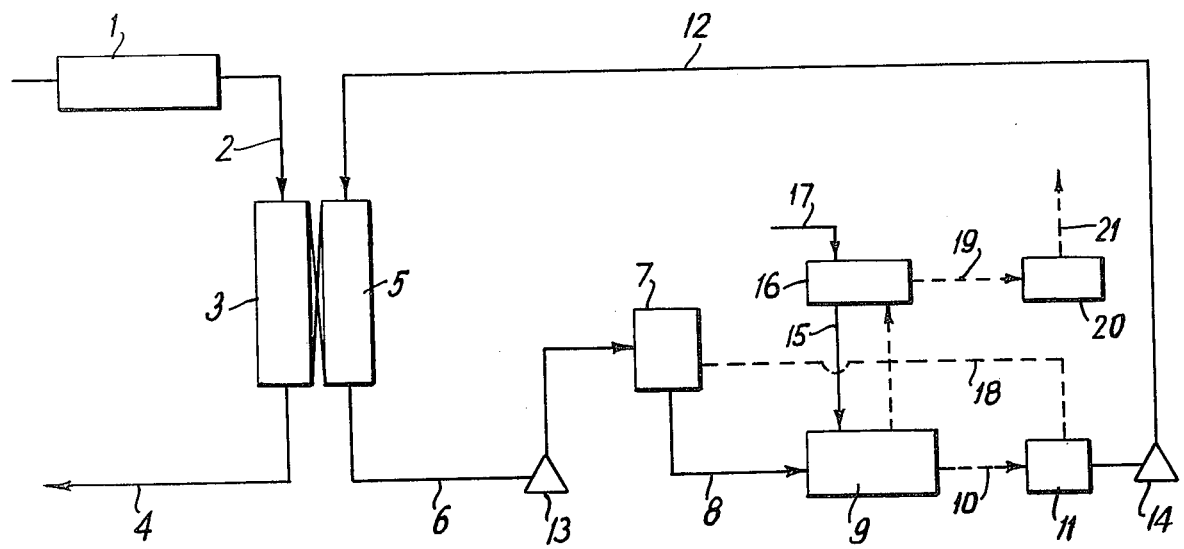
FIG. 1 shows the flow sheet of the procedures of this invention, in which: 1 - drain pit, 2 - drainage-supplying path, 3 - zeolite columne, 4 - drainage-discharging path, 5 - zeolite column, 6 - path for electrolytic cell, 7 - electrolytic cell, 8 - path for adjusting bath, 9 - adjusting bath, 10 - path for active carbon column, 11 - active carbon column, 12 - circulating path, 13,14 - pump, 15 - path for adjusting liquid, 16 - adjusting liquid bath, 17 - supplying path of adjusting liquid, 18 - path for generating gas, 19 - path for clean gas, 20 - active carbon column, 21 - gas-discharging path.

The present invention pertaining to the removing process of the ammonia nitrogen is hereinafter described in detail by using the flow sheet of the drawing.

Drain pit 1 is connected with ion-exchange column 3 via drainage-supplying path 2. Natural or synthetic zeolite is usually packed as the ion-exchange substance in the column 3, with which drainage-discharging path 4 is joined. Other ion-exchange column 5 which is interchangeable, as occasion demands, with the column 3 is provided and is joined with electrolytic cell 7 via path 6 for electrolytic cell. natural or synthetic zeolite is packed in the column 5 too. The electrolytic cell 7 is joined with adjusting bath 9 through path 8 for adjusting bath, and the adjusting bath 9 is united with active carbon column 11 via path 10 for active carbon column. The active carbon column 11 is united with the afore-mentioned zeolite column 5 through circulating path 12 to form a circulating circuit. The path 6 for electrolytic cell and the circulating path 12 are installed with pumps 13 and 14, respectively. The adjusting bath 9 is joined, via path 15 for adjusting liquid, with adjusting liquid bath 16 which is united with supplying path 17 of adjusting liquid. Furthermore, the electrolytic cell 7, the adjusting bath 9, and the active carbon column 11 are united, through path 18 for generating gas, with the adjusting liquid bath 16 which is united with active carbon column 20 via path 19 for clean gas. With gas-discharging path 21 is connected the active carbon column 20.

When more simplified system, rather than more effective removal, is desired, the adjusting bath 9 can be joined with the circulating path 12 through pump 14 and the path 18 for generating gas can be directly united with the gas-discharging path 21.

In this system the drainage containing the ammonia nitrogen is conducted from the drain pit 1 to the zeolite column 3 through the drainage-supplying path 2. Zeolite functions as an selecting ion-exchange substance and adsorbs the ammonia nitrogen in the form of ammonium ion while the drainage passes through the column 3 as follows:

$$NH_4^+ + Z-Na \rightarrow Na^+ + Z-NH_4 \qquad (1)$$

Accordingly, molar quantity of ammonium ion adsorbed in zeolite from drainage is equal to that of sodium ion discharged in the drainage from the zeolite when the exchange capacity of the zeolite amounts to 100 milli-equivalents/100 g zeolite, $0.1 \times 23$ g = 2.3 g of sodium ion per 100 g of zeolite is discharged in the drainage and corresponding $0.1 \times 18$ g = 1.8 g of ammonium ion is adsorbed in the zeolite. The drainage, after the adsorption treatment in the zeolite column 3, is discharged via the drainage-discharging path 4 to the outside of the system. In the adsorption process, the rate of flow of the drainage is 1 – 20 cv/hour, practically 2 – 10 cv/hour, to ensure the reaction.

Elution process starts by exchanging the column 3 for the column 5 before saturation of the ion-exchange capacity of zeolite. Through the column 5 is passed a treating liquid containing mainly alkali metal chlorides among which sodium chloride and potassium chloride are favorably used and the other alkali metal salts can also be used. A case in which the liquid containing mainly sodium chloride is utilized is a typical one as described below. The concentration of the salt ranges 0.1 – 6.0 N, preferably 0.1 – 4.0 N and the rate of flow of the treating liquid is equal to that of the said drainage.

When the treating liquid consisting of the sodium chloride solution, in which the sodium ion concentration is much higher than the ammonium ion concentration in the zeolite column 5, is passed through the column 5, the ammonium ion adsorbed in the zeolite is eluted in the treating liquid as follows:

$$NaCl + Z-NH_4 \rightarrow NH_4Cl + Z-Na \qquad (2)$$

Thus, molar quantity of the eluted ammonium ion is equal to that of the exchanging sodium ion with the ammonium ion as in the case of the adsorption process. If the exchange capacity of the zeolite amounts to 100 milli-equivalents/100 g zeolite as before, 2.3 g of sodium ion substitutes for 1.8 g of ammonium ion per 100 g of zeolite. This quantity of the sodium ion is identical with that discharged in the adsorption process and the exchange capacity of the zeolite recovers to the original state. As for the treating liquid 2.3 g of sodium ion decreases and 1.8 g of ammonium ion increases per 100 g of zeolite.

A quantity of the treating liquid after the elution process is conducted to the electrolytic cell 7 via the path 6 for electrolytic cell and pump 13. As the electrolytic cell 7, either a diaphragmless cell equipped with an anode of platinum-plated titanium and a cathode of iron or a bipolar electrolytic cell equipped with electrodes of platinum-plated titanium is favorably employed.

In the electrolysis process the treating liquid is electrolyzed as follows to afford sodium hypochlorite which $$2NaCl + 2H_2O \rightarrow 2NaOH + Cl_2 + H_2 \qquad (3)$$
$$Cl_2 + 2NaOH \rightarrow NaOCl + H_2O \qquad (4)$$

decomposes the ammonium ion in the treating liquid;

$$2NH_4^+ + 3NaOCl \rightarrow 3NaCl + 3H_2O + N_2 + 2H^+ \qquad (5)$$

It follows from the equations (3), (4), and (5) that the mass balance in this process is as follows:

$$NH_4^+ \rightarrow 3/2\ H_2 + \tfrac{1}{2}\ N_2 + H^+ \qquad (6)$$

$NH_4^+$ is thus decomposed to $N_2$ and $H_2$. In these circumstances 1.8 g of ammonium ion forms 3.36 l of hydrogen gas and 1.12 l of nitrogen gas under S.T.P. per 0.3 faraday. In the electrolysis 80 – 90% of ammonia nitrogen is oxidized and, for that reason, the current density ranges 50 – 500 mA/cm².

As mentioned below the remaining 10 – 20% of ammonia nitrogen is oxidatively decomposed by recovered active chlorine of adjusting liquid in the adjusting bath. By the electrolysis of the treating liquid, 0.1 g of H⁺ per 0.3 faraday is produced as shown in the equation (6) resulting in a decrease of pH of the liquid. Hence reaction of equation (4) is suppressed and a part of chlorine formed by the electrolysis escapes unreacted with ammonium ion from the treating liquid. According to the electrolytic conditions, electrolysis of water as shown in the following equation may be annexed to the electrolytic reaction (4) and (5), generating hydrogen and oxygen gas. In some cases, a part of the $$H_2O \rightarrow H_2 + \tfrac{1}{2}\ O_2 \qquad (7)$$

ammonia nitrogen is converted to nitrogen oxides $NO_x$ by direct electrolytic oxidation or by reaction with the generating gas, without obeying the equation (6).

With the decrease of pH, a portion of chlorine remains in the treating liquid in the form of hypochlorous acid which produces chloramines by the reaction with the ammonia nitrogen as follows:

$$NH_3 + HOCl \rightarrow NH_2Cl + H_2O + H^+ \qquad (8)$$
$$NH_2Cl + HOCl \rightarrow NHCl_2 + H_2O \qquad (9)$$
$$NHCl_2 + HOCl \rightarrow NCl_3 + H_2O \qquad (10)$$

As trichloramine is sparingly soluble in water, the liquid smells of it.

The gas mixture generated in the electrolysis, consisting of hydrogen, oxygen, nitrogen, a small amount of chlorine, a trace of nitrogen oxides, and chloramines, is conducted to the adjusting liquid bath 16 via path 18 for generating gas. The bath 16 is previously filled with adjusting liquid by use of supplying path 17 of adjusting liquid. The adjusting liquid bath 16 has the scrubbing column in which the generating gas is contacted with the adjusting liquid and the means which circulate the adjusting liquid in the scrubbing column. The liquid contains a hydroxide of the same alkali metal as that used in the treating liquid. Namely, when sodium chloride solution is used as the treating liquid, sodium hydroxide solution is used as the adjusting liquid. The acid gas containing mainly chlorine and nitrogen oxides in the generating gas are absorbed in the alkaline adjusting liquid in the adjusting liquid bath 16. For example, chlorine dissolves in the adjusting liquid which contains sodium hydroxide, obeying the said equation (4). The rate of flow of the generated gas is 0.5 – 1.0 m/sec and L/G. 1 – 5 in this absorption-cleansing process by the adjusting liquid, favorably 0.6 – 0.8 m/sec and L/G 2 – 4.

As mentioned above, a trace of chlorine and chloramines which can not be absorbed in the adjusting liquid are conveyed to the active carbon column 20 for adsorption via the path 19 for clean gas. The active carbon of the column 20 is regenerated after a given period of use by washing it with the adjusting liquid. By recovering this adjusting liquid into the bath 16, effective chlorine can securely be trapped in the liquid. The trapped chlorine, along with the chlorine absorbed in the said adjusting bath 16, is recovered for its reuse into the treating liquid in the successive adjusting process. In the said cleansing process by active carbon, the generated gas is brought into contact with the active carbon at the rate of flow of 0.1 – 1.0 m/sec for 0.2 – 4.0 sec. favorably at the rate of flow of 0.2 – 0.5 m/sec for 0.5 – 2.0 sec. The gas cleansed by the active carbon column 20 is discharged through the gas-discharging path 21 in the atmosphere. In this case, there is no fear of secondary pollution since the nitrogen oxides and chloramines have securely been removed from the gas by cleansing it with the adjusting liquid and active carbon.

The treating liquid after the electrolytic process is conveyed to the adjusting bath 9 via path 8 for adjusting bath, for the purpose to compensate the decrease of pH due to the increase of $H^+$ by the electrolysis of ammonium ion and to recover the effective chlorine and nitrogen oxides from the adjusting liquid in the treating liquid.

To the adjusting bath 9 is supplied adjusting liquid from the adjusting liquid bath 16 via path 15 for adjusting liquid. The adjusting liquid is added to the said treating liquid. Since the adjusting liquid contains a hydroxide of the same alkali metal as the treating liquid does, namely sodium hydroxide in this case, it is neutralized by the addition of the adjusting liquid, its pH being restored to the fixed value and decreased sodium ion being supplemented.

$$NaOH + H^+ \rightarrow Na^+ + H_2O \qquad (11)$$

When 1.0 g of hydrogen ion per unit increases in the electrolysis, pH remains almost neutral and 2.3 g of sodium ion per unit is supplemented by addition of an equivalent amount of sodium hydroxide (4.0 g). This amount of sodium ion is equal to that decreased from the treating liquid in the afore-mentioned elution process and, accordingly, the treating liquid restores the original concentration of sodium ion by the addition of the adjusting liquid. By this addition, the effective chlorine and nitrogen oxides in the adjusting liquid are transferred to the treating liquid enabling the reuse of the chlorine for further decomposition of remained ammonia nitrogen in the treating liquid. The adjusting liquid is added in 10 – 50 % excess, preferably in 15 – 20 % excess, allowing loss by operation and absorption of acid gas.

In the treating liquid non-volatile chloramines, other than trichloramine, are present. To decompose them, the treating liquid after adjustment is conducted to the active carbon column 11 through the path 10 for active carbon column. Active chlorine and chloramines in this liquid are decomposed as the following equations by the catalytic action of active carbon losing their characteristic smell:

$$C^* + HOCl \rightarrow CO^* + HCl \qquad (12)$$
$$NH_2Cl + H_2O + C^* \rightarrow NH_3 + HCl + CO^* \qquad (13)$$
$$2NH_2Cl + CO^* \rightarrow N_2 + H_2O + 2HCl + C^* \qquad (14)$$
$$2NHCl_2 + H_2O + C^* \rightarrow N_2 + 4HCl + CO^* \qquad (15)$$

Wherein $C^*$ is active carbon and $CO^*$ is adsorbed material on the active carbon. Contact time of the treating liquid on the active carbon in the cleansing process is for 0.2 – 3.0 min, favorably for 0.3 – 2.0 min. The volatile gas from the bath 9 and the column 11 is combined with the gas generated in the electrolytic cell 7 and the whole gas is conveyed to the adjusting bath 16 through 18.

The liquid cleansed by active carbon is circulated to the zeolite column 5 by way of the pump 14 and the circulating path 12. By such recycling use of the treating liquid, the recovered chlorine is reused not to result in the loss of chlorine ion which contributes to the electrolytic oxidation. The nitrogen oxides recovered in the treating liquid circulate the closed system and, then, their concentration gradually increases. They are, however, electrolyzed competitively with the treating liquid when the diaphragmless cell or bipolar cell is used and their amount of increase remains within a certain limit.

The present invention has practically the following excellent effects.

The ammonia nitrogen in drainage is effectively removed by the successive, stepwise processes such as adsorption elution electrolysis, adjustment, and cleansing. Its concentration after adsorption process can be suppressed below 1 ppm. When the ammonium ion is directly decomposed by the oxidizing action of chlorine in the ion-exchange substance column, reaction of the effective chlorine of undecomposed chloramines with ammonia occurs evolving gas, in addition to the generation of chlorine. This obstructs ammonium ion from eluting and dispersing from zeolite to treating liquid, decreasing the efficiency of removing the ammonia nitrogen.

By recovering chlorine and nitrogen oxides in the treating liquid and circulating this liquid, discharge of them outside the system and secondary pollution are prevented enabling reuse of chlorine and decomposition of the nitrogen oxides by electrolytic reduction.

Secondary pollution by escaping ammonia in the atmosphere does not occur since the ammonia nitrogen is decomposed to nitrogen in the system.

The ammonia nitrogen can be steadily decomposed without being influenced by the change of temperature and of its concentration since it is decomposed by electrolysis.

There is no need to use dangerous liquid chlorine as compared with the method of break point chlorination. Moreover, the concentration of chlorine ion in the treated drainage does not increase since chlorine is recovered in the closed system.

Zeolite shows only no decrease of its ion-exchange capacity since it is regenerated without being heated.

The equipment of each process is hardly corroded by acids. Hence the ammonia nitrogen can be removed simply, safely, and economically by this invention.

For the purpose of illustration only, this invention will be illustrated by the following examples.

EXAMPLE 1

A quantity of secondary drainage from a small scale plant of sewage treatment was treated by adding 50 ppm of alum and by removing the solid. This drainage was passed through the column (internal diameter, 50 mm) packed with 1.10 l of natural zeolite yielded in Kyūsyū (mordenite; particle size, 0.50 – 0.86 mm) at the rate of flow of 5 cv/hour for the adsorption.

The analytical result of influent and effluent are shown in the first column of Table 1. Through the zeolite column adsorbing the ammonium ion was passed downward 20 l of 1N sodium chloride solution at the rate of flow of 5 cv/hour to elute the ammonium ion adsorbed and to regenerate the zeolite. The result is compared with that before elution in the second column of Table 1. This sodium chloride solution was connected to and electrolyzed in a bipolar sextuple electrolytic cell for the oxidative decomposition of the ammonium ion. The result and the conditions of this electrolysis are listed in the third and the lowest columns of Table 1, respectively. The generated gas was discharged in the atmosphere. On the other hand, the sodium chloride solution electrolyzed was conveyed to an adjusting bath and 200 ml of 10 % sodium hydroxide solution was added to it. The result of this adjustment is shown in the fourth column of Table 1. The sodium chloride solution adjusted was again circulated to the zeolite column and the said treatments were repeated in turn. The result is listed comparatively in each column of Table 1, the figures in which being those of mean values.

EXAMPLE 2

A quantity of secondary drainage from a night soil disposal plant was treated by adding 100 ppm of alum and by removing the solid. This drainage was passed through the column (internal diameter, 50 mm) packed with 1.07 l of natural zeolite produced in Futatsui (clinoptilolite, particle size, 0.50 – 0.86 mm) and treated as described in Example 1. The result is listed in Table 2.

Twenty liters of 1N sodium chloride solution was used as the treating liquid and 300 ml of 10 % sodium hydroxide solution as the adjusting liquid. The figures in Table 2 are those of mean values.

EXAMPLE 3

To secondary drainage from a night soil disposal plant was added 100 ppm of alum and the solid was removed. This drainage was passed through the column (internal diameter, 50 mm) packed with 1.7 l of natural zeolite produced in Futatsui clinoptilolite; particle size, 0.50 – 0.86 mm) at the rate of flow of 5 cv/hour. The analytical result of influent and effluent are shown in the first column of Table 3. To the column was introduced downward 20 l of 1N potassium chloride solution at the rate of flow of 5 cv/hour to elute the ammonium ion adsorbed. The result obtained is compared with that before elution in the second column of Table 3. This potassium chloride solution was conveyed to and electrolyzed in a similar electrolytic cell as in Example 1 for the oxidative decomposition of the ammonium ion. The result and the conditions of this electrolysis are listed in the third and the lowest columns of Table 3, respectively. Then the generated gas was discharged in the atmosphere. On the other hand, the electrolyzed treating liquid containing potassium chloride was conducted to an adjusting bath and added with 300 ml of 10% potassium hydroxide solution. The result of the adjustment is shown in the fourth column of Table 3. The potassium chloride solution thus treated was again circulated to the zeolite column and the said treatments were repeated in turn. The result is listed comparatively in each column of Table 3, the figures in which being those of mean values.

EXAMPLE 4

To secondary drainage from a small scale plant of sewage treatment was added 50 ppm of alum and the solid was removed. This drainage was passed through the column (internal diameter, 50 mm) packed with 1.10 l of natural zeolite produced in Kyūsyū (mordenite; particle size, 0.5 – 0.86 mm) at the rate of flow of 5 cv/hour. The analytical result of influent and effluent are shown in the first column of Table 4. Through the zeolite adsorbing the ammonium ion, was passed downward 20 l of 1N sodium chloride solution at the rate of flow of 5 cv/hour to elute the ammonium ion adsorbed. The result of the elution is compared in the second column of Table 4. This sodium chloride solution was conveyed to and electrolyzed in a bipolar sextuple electrolytic cell the oxidative decomposition of the ammonium ion. The result and the conditions of the electrolysis are shown in the third and the lowest columns of Table 4, respectively. The gas generated by the electrolysis was conducted via the path for generated gas to an adjusting bath at the rate of 0.7 m/sec and L/G. 3, and submitted to contact with the adjusting liquid containing 10 % sodium hydroxide for the absorption of acid gas such as nitrogen oxides and chlorine. The result of this cleansing process is listed in the fourth column of Table 4. Then the generated gas was introduced to an active carbon column at the rate of 0.3 m/sec for 0.3 sec and discharged in the atmosphere. On the other hand, the sodium chloride solution electrolyzed was conveyed to an adjusting bath and added with 200 ml of acid gas-absorbed solution of sodium hydroxide. The result of this adjustment is shown in the fifth column of Table 4. The sodium chloride solution adjusted was introduced to an active carbon column packed with 500 ml of active carbon (particle size, 1.52 – 0.98 mm) for cleansing and reused for the regenerating the zeolite.

The said treatments were then repeated in turn. The result is listed comparatively for each process in each column of Table 4, the figures in which being those of mean values.

EXAMPLE 5

To secondary drainage from a night soil disposal plant was added 100 ppm of alum and the solid was removed. This drainage was passed through the column (internal diameter, 50 mm) packed with 1.07 l of natural zeolite yielded in Futatsui clinoptilolite; particle size. 0.5 – 0.86 mm) and treated as described in Example 4. The result is represented in Table 5.

Twenty liters of 1N sodium chloride solution was used as the treating liquid and 400 ml of 10 % sodium hydroxide solution as the adjusting liquid. The figures in Table 4 are those of mean values.

EXAMPLE 6

A quantity of secondary drainage from a night soil disposal plant was treated by adding 100 ppm of alum and by removing the solid. This drainage was passed through the column (internal diameter, 50 mm) packed with 1.07 l of natural zeolite yielded in Futatsui clinoptilolite; particle size, 0.50 – 0.86 mm) at the rate of flow of 5 cv/hour for the adsorption. The analytical result of influent and effluent are shown in the first column of Table 6. Through the zeolite adsorbing the ammonium ion, was passed downward 20 l of 1N potassium chloride solution at the rate of flow of 5 cv/hour to elute the ammonium ion. The result is compared with that before elution in the second column of Table 6. This potassium chloride solution was conveyed to and electrolyzed in a similar electrolytic cell as in Example 4 for the oxidative decomposition of the ammonium ion. The result and the conditions of this electrolysis are listed in the third and the lowest columns of Table 6, respectively. The gas evolved by the electrolysis was introduced via the path for generated gas to an adjusting bath at the rate of 0.7 m/sec and L/G. 3, and submitted to contact with the adjusting liquid containing 10% potassium hydroxide for the absorption of acid gas such as nitrogen oxides and chlorine. The result of this cleansing process is represented in the fourth column of Table 6. Then the generated gas was conducted to an active carbon column at the rate of 0.3 m/sec for 0.3 sec and discharged in the atmosphere. On the other hand, the potassium chloride solution electrolyzed was conveyed to an adjusting bath and added with 300 ml of acid gas-absorbed solution of potassium hydroxide. The result of this adjustment is shown in the fifth column of Table 6. The potassium chloride solution thus adjusted was introduced to an active carbon column packed with 500 ml of active carbon (particle size, 1.52 - 0.98 mm) for cleansing and reused for the regenerating the zeolite. The afore-mentioned treatments were then repeated in turn. The result is listed comparatively for each process in each column of Table 6. The figures are those of mean values.

Table 1

|  |  |  | 1 | 2 | 3 |
|---|---|---|---|---|---|
| Adsorption process influent | PH |  | 7.50 | 7.45 | 7.50 |
|  | $NH_3$—N | ppm | 20.4 | 18.7 | 19.7 |
|  | $Na^+$ | ppm | 62 | 70 | 65 |
|  | $K^+$ | ppm | 12 | 12 | 13 |
| effluent | effluent 1 / zeolite 1 |  | 320 | 320 | 320 |
|  | PH |  | 7.45 | 7.30 | 7.20 |
|  | $NH_3$—N | ppm | 0.78 | 0.67 | 0.70 |
|  | $Na^+$ | ppm | 100 | 103 | 100 |
|  | $K^+$ | ppm | 1 | 1 | 1 |
|  | the quantity of ammonium ion adsorbed | mlq/100g | 45.5 | 41.6 | 44.0 |
| Elution process Treating liquid before elution | PH |  | 7.90 | 7.85 | 7.90 |
|  | $NH_3$—N | ppm | 0 | 7.0 | 2.10 |
|  | $Na^+$ | ppm | 23800 | 23600 | 23500 |
|  | $Cl^-$ | ppm | 36400 | 36000 | 35700 |
| Treating liquid after elution | PH |  | 6.70 | 6.65 | 6.60 |
|  | $NH_3$—N | ppm | 296 | 298 | 355 |
|  | $Na^+$ | ppm | 23200 | 23000 | 22900 |
|  | $Cl^-$ | ppm | 36300 | 36000 | 35600 |
|  | the quantity of ammonium ion eluted | mlq/100g | 42.2 | 40.3 | 48.0 |
| Electrolytic process Treating liquid after electrolysis | PH |  | 1.00 | 1.03 | 1.00 |
|  | $NH_3$—N | ppm | 7.00 | 3.56 | 2.13 |
|  | $Na^+$ | ppm | 23300 | 23000 | 23000 |
|  | $Cl^-$ | ppm | 36000 | 35700 | 35400 |
| Adjusting process | 10% NaOH ml / Treating liquid 20 l |  | 250 | 250 | 250 |
| Treating liquid after adjustment | PH |  | 8.05 | 7.95 | 8.30 |
|  | $Na^+$ | ppm | 23600 | 23500 | 23600 |
| Electrolysis conditions | the flow rate ml/min |  | 100 | 100 | 100 |
|  | ampere |  | 3.0 | 3.0 | 3.0 |
|  | volt |  | 20.2 | 20.0 | 20.0 |
|  | the flow temperature °C |  | 27 | 28 | 27 |

Table 2

|  |  |  | 1 | 2 | 3 |
|---|---|---|---|---|---|
| Adsorption process influent | PH |  | 8.2 | 8.5 | 8.0 |
|  | $NH_3$—N | ppm | 154 | 151 | 149 |
|  | $Na^+$ | ppm | 138 | 152 | 135 |
|  | $K^+$ | ppm | 45 | 46 | 45 |
| effluent | effluent 1 / zeolite 1 |  | 80 | 80 | 80 |
|  | PH |  | 7.00 | 6.85 | 6.90 |
|  | $NH_3$—N | ppm | 1.04 | 0.96 | 0.94 |
|  | $Na^+$ | ppm | 375 | 360 | 380 |
|  | $K^+$ | ppm | 1 | 1 | 1 |
|  | the quantity of ammonium ion adsorbed | mlq/100g | 82.4 | 82.0 | 83.5 |
| Elution process Treating liquid before elution | PH |  | 8.00 | 7.90 | 7.95 |
|  | $NH_3$—N | ppm | 0 | 28.2 | 35.4 |
|  | $Na^+$ | ppm | 23900 | 23600 | 23400 |
|  | $Cl^-$ | ppm | 36300 | 35500 | 34800 |
| Treating liquid after elution | PH |  | 6.95 | 7.05 | 6.90 |
|  | $NH_3$—N | ppm | 592 | 604 | 696 |
|  | $Na^+$ | ppm | 22800 | 22600 | 22200 |
|  | $Cl^-$ | ppm | 35900 | 35300 | 34600 |
|  | the quantity of ammonium ion eluted | mlq/100g | 82.0 | 80.0 | 81.0 |
| Electrolytic process Treating liquid after adjustment | PH |  | 1.00 | 0.95 | 0.95 |
|  | $NH_3$—N | ppm | 28.2 | 35.0 | 32.3 |
|  | $Na^+$ | ppm | 22800 | 22500 | 22300 |
|  | $Cl^-$ | ppm | 35500 | 34800 | 34000 |

Table 2-continued

|  |  | 1 | 2 | 3 |
|---|---|---|---|---|
| Adjusting process | 10% NaOH ml / Treating liquid 20 l | 300 | 300 | 300 |
| Treating liquid after adjustment | PH | 8.10 | 7.95 | 8.00 |
|  | $Na^+$ ppm | 23600 | 23400 | 23100 |
| Electrolysis conditions | the flow rate ml/min | 100 | 100 | 100 |
|  | ampere | 6.0 | 6.0 | 6.0 |
|  | volt | 23.0 | 22.9 | 23.0 |
|  | the flow temperature °C | 30 | 32 | 32 |

Table 3

|  |  |  | 1 | 2 | 3 |
|---|---|---|---|---|---|
| Adsorption process influent | PH |  | 7.50 | 7.45 | 7.45 |
|  | $NH_3$—N | ppm | 18.7 | 19.7 | 20.5 |
|  | $Na^+$ | ppm | 62 | 70 | 65 |
|  | $K^+$ | ppm | 12 | 12 | 13 |
| effluent | effluent l / zeolite l |  | 250 | 250 | 250 |
|  | PH |  | 7.45 | 7.30 | 7.20 |
|  | $NH_3$—N | ppm | 0.90 | 1.17 | 1.10 |
|  | $Na^+$ | ppm | 70 | 74 | 68 |
|  | $K^+$ | ppm | 58 | 59 | 60 |
|  | the quantity of ammonium ion adsorbed | mlq/100g | 35.4 | 32.5 | 34.3 |
| Elution process Treating liquid before elution | PH |  | 8.00 | 7.95 | 8.05 |
|  | $NH_3$—N | ppm | 0 | 7.14 | 4.29 |
|  | $K^+$ | ppm | 40000 | 39700 | 39600 |
|  | $Cl^-$ | ppm | 36000 | 35700 | 35300 |
| Treating liquid after elution | PH |  | 6.85 | 6.70 | 6.90 |
|  | $NH_3$—N | ppm | 246 | 230 | 253 |
|  | $K^+$ | ppm | 39200 | 39100 | 38800 |
|  | $Cl^-$ | ppm | 35900 | 35700 | 35200 |
|  | the quantity of ammonium ion eluted | mlq/100g | 35.0 | 32.1 | 34.0 |
| Electrolytic process Treating liquid after electrolysis | PH |  | 1.10 | 1.13 | 1.06 |
|  | $NH_3N$ | ppm | 7.14 | 4.29 | 4.77 |
|  | $K^+$ | ppm | 39200 | 39000 | 38800 |
|  | $Cl^-$ | ppm | 35700 | 35300 | 35100 |
| Adjusting process | 10% KOH ml / Treating liquid 20 l |  | 350 | 350 | 350 |
| Treating liquid after adjustment | PH |  | 7.95 | 8.10 | 7.66 |
|  | $K^+$ | ppm | 39700 | 39600 | 39400 |
| Electrolysis conditions | the flow rate ml/min |  | 100 | 100 | 100 |
|  | ampere |  | 2.5 | 2.5 | 2.5 |
|  | volt |  | 19.2 | 19.2 | 19.3 |
|  | the flow temperature °C |  | 25 | 25 | 25 |

Table 4

|  |  |  | 1 | 2 | 3 | 4 | 5 |
|---|---|---|---|---|---|---|---|
| Adsorption process influent | PH | ppm | 7.50 | 7.45 | 7.50 | 7.50 | 7.50 |
|  | $NH_3$—N | ppm | 20.4 | 18.7 | 19.7 | 20.0 | 20.0 |
|  | $Na^+$ | ppm | 62 | 70 | 65 | 70 | 75 |
| effluent | effluent l / zeolite l |  | 320 | 320 | 320 | 320 | 320 |
|  | PH |  | 7.45 | 7.30 | 7.20 | 7.40 | 7.45 |
|  | $NH_3$—N | ppm | 0.78 | 0.67 | 0.70 | 0.77 | 0.77 |
|  | $Na^+$ | ppm | 100 | 103 | 100 | 106 | 110 |
|  | the quantity of ammonium ion adsorbed | mlq/100g | 45.7 | 41.8 | 44.2 | 44.7 | 44.7 |
| Elution process Treating liquid before elution | PH |  | 7.10 | 6.85 | 6.90 | 6.70 | 6.90 |
|  | $NH_3$—N | ppm | 0 | 14.0 | 17.6 | 16.8 | 21.0 |
|  | $Na^+$ | ppm | 23800 | 23600 | 23200 | 23500 | 23600 |
|  | $Cl^-$ | ppm | 36400 | 36200 | 36800 | 35900 | 36600 |
| Treating liquid after elution | PH |  | 6.70 | 6.65 | 6.60 | 6.50 | 6.85 |
|  | $NH_3$—N | ppm | 296 | 298 | 355 | 298 | 344 |
|  | $Na^+$ | ppm | 23100 | 23100 | 23000 | 22800 | 23000 |

Table 4-continued

|  |  |  | 1 | 2 | 3 | 4 | 5 |
|---|---|---|---|---|---|---|---|
|  | Cl⁻ | ppm | 36300 | 36200 | 36200 | 36700 | 36500 |
|  | the quantity of ammonium ion eluted | mlq/100g | 42.2 | 40.3 | 48.0 | 40.0 | 46.0 |
| Electrolytic process Treating liquid after electrolysis | PH | | 1.20 | 1.15 | 1.10 | 1.35 | 1.30 |
|  | NH₃—N | ppm | 37.8 | 40.6 | 42.0 | 46.5 | 49.1 |
|  | NO₃—N | ppm | 22 | 42 | 60 | 80 | 82 |
|  | Na⁺ | ppm | 22800 | 23200 | 23300 | 23000 | 23100 |
|  | Cl⁻ | ppm | 36200 | 35900 | 35500 | 35800 | 35800 |
| Cleansing process Adjusting liquid after adjustment | PH | | >13.5 | >13.5 | >13.5 | >13.5 | >13.5 |
|  | Av-Cl | ppm | 24000 | 23200 | 21100 | 24400 | 28800 |
|  | Cl⁻ | ppm | 25000 | 27000 | 27800 | 28100 | 32000 |
|  | NO₃—N | ppm | 450 | 210 | 650 | 500 | 410 |
| Adjusting process Treating liquid after adjustment | PH | | 6.85 | 6.90 | 6.70 | 6.90 | 6.90 |
|  | NH₃—N | ppm | 14.0 | 17.6 | 16.8 | 21.0 | 21.0 |
|  | NO₃—N | ppm | 25 | 44 | 65 | 91 | 83 |
|  | Na⁺ | ppm | 23600 | 23200 | 23500 | 23600 | 23500 |
|  | Cl⁻ | ppm | 36200 | 36800 | 35900 | 36600 | 36100 |
| Electrolysis conditions | the flow rate ml/min | | 100 | 100 | 100 | 100 | 100 |
|  | ampere | | 6.0 | 6.0 | 6.0 | 6.0 | 6.0 |
|  | volt | | 23.1 | 23.1 | 23.2 | 23.3 | 23.3 |
|  | the flow temperature °C | | 32 | 32 | 33 | 33 | 33 |

Table 5

|  |  |  | 1 | 2 | 3 | 4 | 5 |
|---|---|---|---|---|---|---|---|
| Adsorption process influent | PH | | 8.1 | 8.3 | 8.2 | 8.5 | 8.0 |
|  | NH₃—N | ppm | 145 | 135 | 154 | 161 | 149 |
|  | Na⁺ | ppm | 145 | 138 | 142 | 152 | 135 |
| effluent | effluent 1 zeolite 1 | | 80 | 80 | 80 | 80 | 80 |
|  | PH | | 7.9 | 7.0 | 6.9 | 7.2 | 6.7 |
|  | NH₃—N | ppm | 0.95 | 0.90 | 0.96 | 1.04 | 0.96 |
|  | Na⁺ | ppm | 375 | 360 | 380 | 355 | 385 |
|  | the quantity of ammonium ion adsorbed | mlq/100g | 82.4 | 82.0 | 83.5 | 86.0 | 84.4 |
| Elution process Treating liquid before elution | PH | | 7.00 | 6.50 | 6.90 | 6.10 | 6.80 |
|  | NH₃—N | ppm | 0 | 30.0 | 10.0 | 0 | 0 |
|  | Na⁺ | ppm | 23900 | 23000 | 23500 | 23300 | 23200 |
|  | Cl⁻ | ppm | 36000 | 35800 | 35700 | 34700 | 35600 |
| Treating liquid after elution | PH | | 6.50 | 6.30 | 6.50 | 6.30 | 6.80 |
|  | NH₃—N | ppm | 592 | 604 | 696 | 646 | 600 |
|  | Na+ | ppm | 22300 | 22500 | 22700 | 22200 | 22500 |
|  | Cl− | ppm | 35900 | 35500 | 35700 | 35200 | 35100 |
|  | the quantity of ammonium ion eluted | mlq/100g | 82.0 | 80.0 | 81.6 | 90.0 | 83.5 |
| Electrolytic process Treating liquid after electrolysis | PH | | 1.10 | 1.10 | 1.00 | 1.05 | 1.10 |
|  | NH₃-N | ppm | 97.4 | 142 | 49.0 | 56.7 | 58.2 |
|  | NO₃—N | ppm | 42 | 85 | 100 | 120 | 125 |
|  | Na⁺ | ppm | 22300 | 21200 | 23000 | 22000 | 22900 |
|  | Cl⁻ | ppm | 35000 | 35100 | 35400 | 34600 | 34900 |
| Cleansing process | PH | | >13.5 | >13.5 | >13.5 | >13.5 | >13.5 |
|  | NO₃—N | ppm | 450 | 210 | 835 | 675 | 557 |
|  | Av—Cl | ppm | 34700 | 31400 | 28800 | 31100 | 32200 |
|  | Cl⁻ | ppm | 33000 | 29900 | 28300 | 33800 | 33000 |
| Adjusting process Treating liquid after adjustment | PH | | 6.50 | 6.90 | 6.10 | 6.80 | 6.70 |
|  | NH₃—N | ppm | 30.0 | 10.0 | 0 | 0 | 0 |
|  | NO₃—N | ppm | 50 | 90 | 115 | 136 | 135 |
|  | Na⁺ | ppm | 23000 | 23500 | 23300 | 23200 | 23700 |
|  | Cl⁻ | ppm | 35800 | 35700 | 34700 | 35600 | 35200 |
| Electrolysis conditions | the flow rate ml/min | | 100 | 100 | 100 | 100 | 100 |
|  | ampere | | 3.0 | 3.0 | 3.0 | 3.0 | 3.0 |
|  | volt | | 18.6 | 18.6 | 18.7 | 18.7 | 18.8 |
|  | the flow temperature °C | | 20 | 20 | 20 | 20 | 20 |

Table 6

| | | | 1 | 2 | 3 | 4 | 5 |
|---|---|---|---|---|---|---|---|
| Adsorption process influent | PH | | 8.2 | 8.0 | 8.3 | 8.1 | 8.1 |
| | NH₃—N | ppm | 145 | 161 | 135 | 152 | 142 |
| | Na⁺ | ppm | 145 | 152 | 138 | 140 | 146 |
| | K⁺ | ppm | 45 | 46 | 44 | 45 | 44 |
| effluent | effluent 1 zeolite 1 | | 50 | 50 | 50 | 50 | 50 |
| | PH | | 7.00 | 6.85 | 6.80 | 6.90 | 6.85 |
| | NH₃—N | ppm | 1.13 | 1.16 | 1.14 | 1.28 | 1.42 |
| | K⁺ | ppm | 430 | 433 | 431 | 435 | 431 |
| | the quantity of ammonium ion adsorbed | mlq/100g | 51.4 | 51.0 | 52.2 | 52.0 | 52.4 |
| Elution process Treating liquid before elution | PH | | 8.00 | 7.95 | 7.85 | 7.85 | 7.90 |
| | NH₃—N | ppm | 0 | 0 | 0 | 0 | 0 |
| | K⁺ | ppm | 39300 | 39000 | 39000 | 38800 | 38900 |
| | Cl⁻ | ppm | 36000 | 35800 | 35500 | 35700 | 35600 |
| Treating liquid after elution | PH | | 6.70 | 6.60 | 6.60 | 6.60 | 6.60 |
| | NH₂—N | ppm | 368 | 370 | 374 | 375 | 378 |
| | K⁺ | ppm | 38100 | 38000 | 37900 | 37800 | 37700 |
| | Cl⁻ | ppm | 35900 | 35800 | 35600 | 35500 | 35400 |
| | the quantity of ammonium ion eluted | mlq/100g | 51.0 | 51.0 | 52.0 | 52.0 | 52.2 |
| Electrolytic process Treating liquid after electrolysis | PH | | 1.10 | 1.00 | 1.00 | 1.05 | 1.00 |
| | NH₃—N | ppm | 65.9 | 68.7 | 61.9 | 66.3 | 62.8 |
| | NO₃—N | ppm | 20 | 42 | 80 | 104 | 100 |
| | K⁺ | ppm | 38100 | 38000 | 37900 | 37800 | 37700 |
| | Cl⁻ | ppm | 35200 | 35000 | 35100 | 34800 | 34900 |
| Cleansing process Adjusting liquid after absorption | PH | | >13.5 | >13.5 | >13.5 | >13.5 | >13.5 |
| | NO₃—N | ppm | 520 | 650 | 870 | 600 | 680 |
| | Av—Cl | ppm | 35500 | 37900 | 38300 | 36400 | 35300 |
| | Cl⁻ | ppm | 35300 | 35600 | 35700 | 35800 | 34900 |
| Adjusting process Treating liquid after adjustment | PH | | 8.00 | 7.90 | 7.90 | 7.90 | 8.05 |
| | NH₃—N | ppm | 0 | 0 | 0 | 0 | 0 |
| | NO₃—N | ppm | 28.0 | 57.0 | 102 | 120 | 118 |
| | K⁺ | ppm | 39100 | 39000 | 38800 | 38900 | 38700 |
| | Cl⁻ | ppm | 35800 | 35500 | 35700 | 35600 | 35500 |
| Electrolysis conditions | the flow rate ml/min | | 100 | 100 | 100 | 100 | 100 |
| | ampere | | 4.0 | 4.0 | 4.0 | 4.0 | 4.0 |
| volt | | | 20.2 | 20.2 | 20.3 | 20.3 | 20.3 |
| | the flow temperature °C | | 25 | 25 | 25 | 25 | 25 |

What we claim is:

1. A process for removing ammoniacal nitrogen from waste water by subjecting said water containing ammonium ions to adsorbtion on an ion-exchange substance and eluting the same comprising passing an alkaline eluant liquid containing alkali metal chlorides through the ion-exchange substance to elute the same, electrolyzing the liquid eluate containing the said ammonium ions to decompose the ammonium ion by the oxidizing effect of chlorine thereby evolved, discharging the gas generated by said decomposition, adding to the electrolyzed liquid an adjusting liquid which contains a hydroxide of the same alkali metal as that used in the eluant liquid to adjust the pH thereof and to supplement the alkali metal ion consumed in the foregoing steps, and recirculating the adjusted eluant to said ion-exchange substance.

2. The process of claim 1 wherein sodium chloride solution is used as the eluant liquid and sodium hydroxide solution is used as the adjusting liquid.

3. The process of claim 2 wherein the concentration and the rate of flow of the eluant liquid are 0.1 – 6.0 N and 1.0 – 20 cv/hour, respectively.

4. The process of claim 1 wherein potassium chloride solution is used as the eluant liquid and potassium hydroxide solution is used as the adjusting liquid.

5. The process of claim 4 wherein the concentration and the rate of flow of the eluant liquid are 0.1 – 6.0 N and 1.0 – 20 cv/hour, respectively.

6. The process of claim 1 wherein the gas generated by electrolysis is first subjected to contact with the adjusting liquid to absorb its acid constituents, containing mainly chlorine and nitrogen oxides, then treated with activated carbon and discharged from the system, and the adjusted electrolyzed eluate is treated with activated carbon before recirculating the same to said ion-exchange substance.

7. The process of claim 6 wherein sodium chloride solution is used as the eluant liquid and sodium hydroxide solution is used as the adjusting liquid.

8. The process of claim 6 wherein the concentration and the rate of flow of the eluant liquid are 0.1 – 6.0 N and 1.0 – 20 cv/hour, respectively.

9. The process of claim 6 wherein the rate of flow of the generated gas is 0.5 – 1.0 m/sec; contact of the generated gas with the adjusting liquid is L/G. 1–5; contact time of the generated gas with activated carbon is for 0.2 – 4.0 sec, and that of the eluant liquid with activated carbon is for 0.2 – 3.0 min.

10. The process of claim 6 wherein potassium chloride solution is used as the eluant liquid and potassium hydroxide solution is used as the adjusting liquid.

* * * * *